(12) United States Patent  (10) Patent No.: US 7,922,241 B2
Kloock  (45) Date of Patent: Apr. 12, 2011

(54) SUNSHADE WITH ADJUSTABLE SLIDE PORTION

(75) Inventor: Scott Kloock, Washington, MI (US)

(73) Assignee: Simco Automotive, Grand Rapids, MI (US)

( * ) Notice: Subject to any disclaimer, the term of this patent is extended or adjusted under 35 U.S.C. 154(b) by 25 days.

(21) Appl. No.: 12/512,604

(22) Filed: Jul. 30, 2009

(65) Prior Publication Data

US 2010/0026055 A1 Feb. 4, 2010

Related U.S. Application Data

(60) Provisional application No. 61/084,835, filed on Jul. 30, 2008.

(51) Int. Cl.
*B60J 7/043* (2006.01)

(52) U.S. Cl. .......... 296/216.04; 296/216.08; 296/216.09

(58) Field of Classification Search .................. 296/215, 296/216.01, 216.04, 216.07, 216.08, 216.09
See application file for complete search history.

(56) References Cited

U.S. PATENT DOCUMENTS 6,729,074 B1 5/2004 Huisman et al.
7,810,872 B1 * 10/2010 Kuribayashi et al. ......... 296/215

* cited by examiner

*Primary Examiner* — Lori L Lyjak

(74) *Attorney, Agent, or Firm* — Howard & Howard Attorneys PLLC

(57) ABSTRACT

A sunshade for a vehicle having a first guide and a second guide spaced from the first guide. The sunshade has a pair of edges and includes a substrate layer and an aesthetic layer fixed to the substrate layer to present a show surface. Slide portions are disposed along each of the edges and are adapted to move within the first and second guides as the sunshade moves between an open position and a closed position. The slide portions define a generally corrugated configuration to provide a force that must be overcome to move the sunshade between the open position and the closed position.

13 Claims, 11 Drawing Sheets

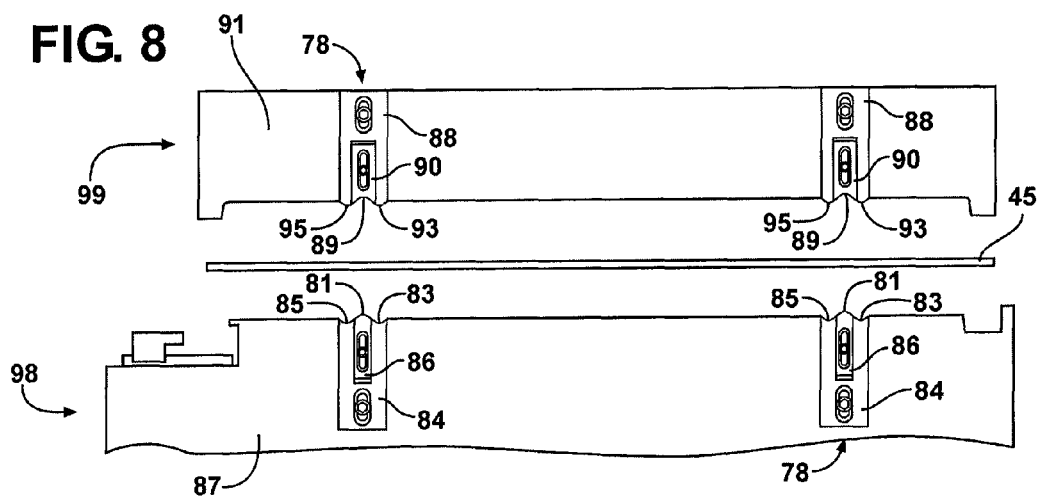
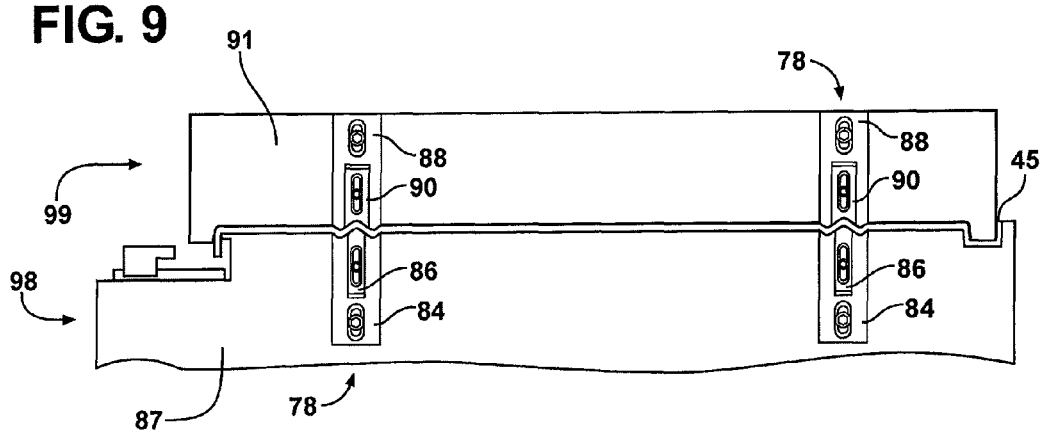
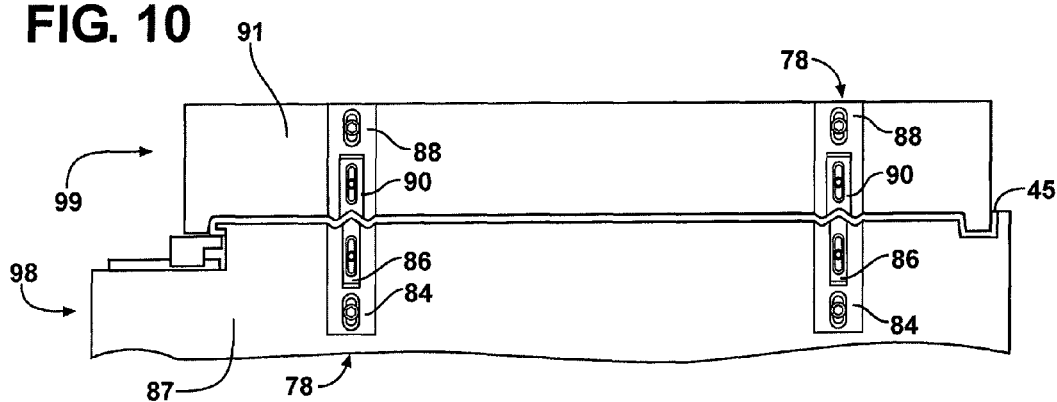

SUNSHADE WITH ADJUSTABLE SLIDE PORTION

RELATED APPLICATION

This application claims the benefit of U.S. Provisional Patent Application No. 61/084,835, filed on Jul. 30, 2008, which is hereby incorporated by reference in its entirety.

FIELD OF THE INVENTION

The subject invention generally relates to a sunshade for a vehicle. More specifically, the subject invention relates to a slide portion for the sunshade that allows movement of the sunshade between open and closed positions.

BACKGROUND OF THE INVENTION

Sunshades are generally known in the art for blocking or filtering light passing through an opening in a roof of a vehicle. The sunshade is generally disposed within a pair of guides and is movable between an open position where the opening is exposed and light is allowed to pass through, and a closed position in which the sunshade covers the opening for blocking or filtering the light coming through. Controlling frictional forces between the sunshade and the guides is needed to maintain consistent and smooth movement of the sunshade between the open and closed positions. In other words, when the frictional forces are inconsistent, an applied force required to move the sunshade between the open and closed positions is also inconsistent. It is desired that the applied force be relatively consistent for a user.

Various methods are taught by the prior art to control the frictional forces including the use of sliding shoes clipped along the edges of the sunshade. Other sunshades employ a curved panel portion to limit contact between the sunshade and the guides, see, e.g., U.S. Pat. No. 6,729,074. Relying on the curve or crown of the panel portion requires that the panel portion have sufficient strength and consistent physical properties that will maintain consistent frictional forces. In other words, variations in the curve or crown or in the physical properties of the sunshade could alter the frictional forces, and consequently, alter the applied force required to move the sunshade between the open and closed positions.

It is desirable for the sunshade to operate smoothly when moving between the open position and the closed position. It is also desirable to provide a process for making sunshades that allows quick and easy adjustment of the frictional force acting between the sunshade and the guides to maintain a consistent frictional force and required applied force during the manufacturing process. Several variables can contribute to varying the frictional force including the nature of the material (coefficient of friction), the weight, shape, and rigidity of the material, as well as many other factors.

SUMMARY OF THE INVENTION

The invention provides a sunshade for a vehicle. The sunshade is configured to move between open and closed positions within a first guide and a second guide spaced from the first guide. The sunshade includes a panel portion having a pair of edges. The panel portion includes a substrate layer and an aesthetic layer fixed to the substrate layer. At least one slide portion is disposed along each of the edges and is adapted to move within the first and second guides as the sunshade moves between the open position and the closed position. The slide portions define a generally corrugated configuration for providing a force that must be overcome to move the sunshade between the open position and the closed position.

The invention also provides a tooling assembly for forming the slide portions. The assembly includes a first forming portion having a first fixture. A first insert is movable relative to the first fixture. Additionally, the assembly includes a second forming portion having a second fixture. The second forming portion is adapted to move relative to the first forming portion. A second insert is movable relative to the second fixture and complementarily to the first insert. When the forming portions are moved toward one another, they cooperate to form the slide portion in a corrugated configuration. The first insert and the second insert are adjustable during manufacturing to adjust a height of the corrugated configuration and account for variations of the materials forming the sunshade.

The invention still further provides a sunshade module for a vehicle. The module comprises the first guide and the second guide. The module includes a sunshade comprising a panel portion having a pair of edges spaced from one another. At least one slide portion is disposed on each of the edges within the first and second guides. Each of the slide portions presents a generally corrugated configuration that provides a force that must be overcome to move the sunshade between the open position and the closed position.

The slide portions of the subject invention provide several advantages over the prior art designs. By utilizing a generally corrugated configuration, the manufacturer can control forces acting between the sunshade and the guides within which the sunshade moves between the open and closed positions. For instance, by controlling the height of at least part of the corrugations, a larger or smaller normal force results between the slide portions and the guides. As the normal force increases or decreases, so does the frictional force between the slide portions and the guides. Accordingly, the applied force required to move the sunshade between the open and closed positions also changes. As a result, the slide portions can be tuned to achieve a desired applied force. This tuning allows the manufacturer to account for variations in material densities, rigidity, coefficients of friction, shapes, and so on, which may be different for different materials, or even for different lots of the same material.

BRIEF DESCRIPTION OF THE DRAWINGS

Other advantages of the present invention will be readily appreciated as the same becomes better understood by reference to the following detailed description when considered in connection with the accompanying drawings wherein:

FIG. 8 is a side view of a step in forming the sunshade of FIG. 1.

FIG. 9 is a side view of another step in forming the sunshade of FIG. 1.

FIG. 10 is a side view of yet another step in forming the sunshade of FIG. 1.

DETAILED DESCRIPTION OF THE PREFERRED EMBODIMENT

Figure 1:
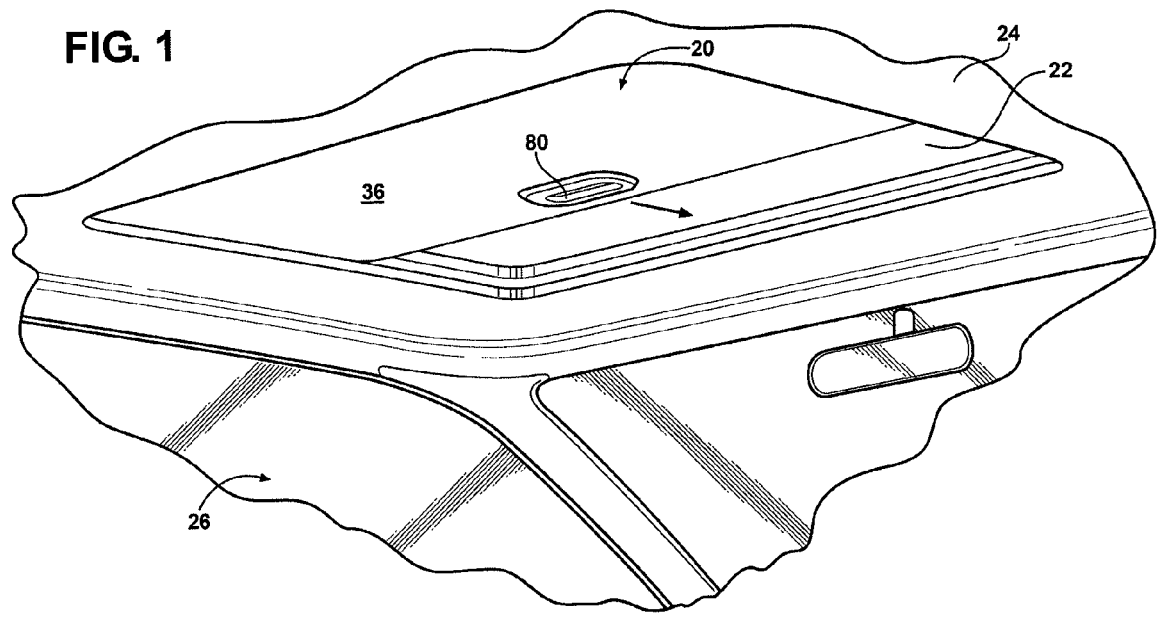
FIG. 1 is a perspective view of a sunshade taken from an interior of a vehicle.

Referring to the Figures, wherein like numerals indicate like or corresponding parts throughout the several views, a sunshade is generally shown at 20. As best shown in FIG. 1, the sunshade 20 is typically used to block or filter sunlight coming through an opening 22 in a roof 24 of a vehicle 26. A pane of glass is typically disposed within the opening 22 and may be a sunroof, a moon roof, a tilt window, a stationary window, or the like.

Figure 2:
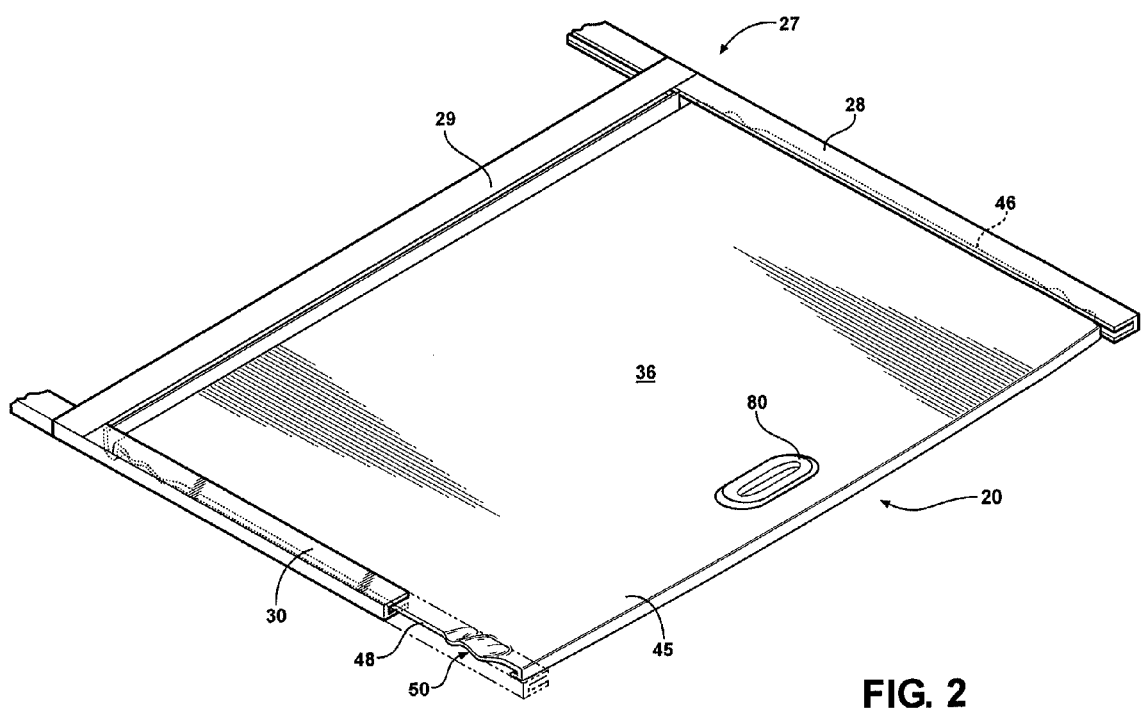
FIG. 2 is a perspective view of a sunshade module including a sunshade disposed within a first guide and a second guide and a crossbeam securing the first and second guides to one another.

Referring additionally to FIG. 2, a first guide 28 and a second guide 30 spaced from the first guide 28 bound the opening 22. The guides 28, 30 guide the sunshade 20 between an open position and a closed position. Generally, the first guide 28 and the second guide 30 are substantially parallel to one another. The guides 28, 30 are preferably C-shaped to define channels for receiving the sunshade 20. However, it should be appreciated that the guides 28, 30 may define any configuration for guiding the sunshade 20 between the open position and the closed position.

Collectively, the sunshade 20 and the guides 28, 30 form a sunshade module 27. In the sunshade module 27, a crossbeam 29 interconnects the guides 28, 30 to support the guides 28, 30. The guides 28, 30 may be formed of metal such as extruded aluminum encapsulated in a polymeric material such as polyvinylchloride (PVC), or the guides 28, 30 may be formed entirely of rigid polymeric material. Likewise, the crossbeam 29 could be formed of metal or polymeric material and welded, bonded, integrally molded with, or otherwise conventionally fastened to the guides 28, 30.

Figure 3:
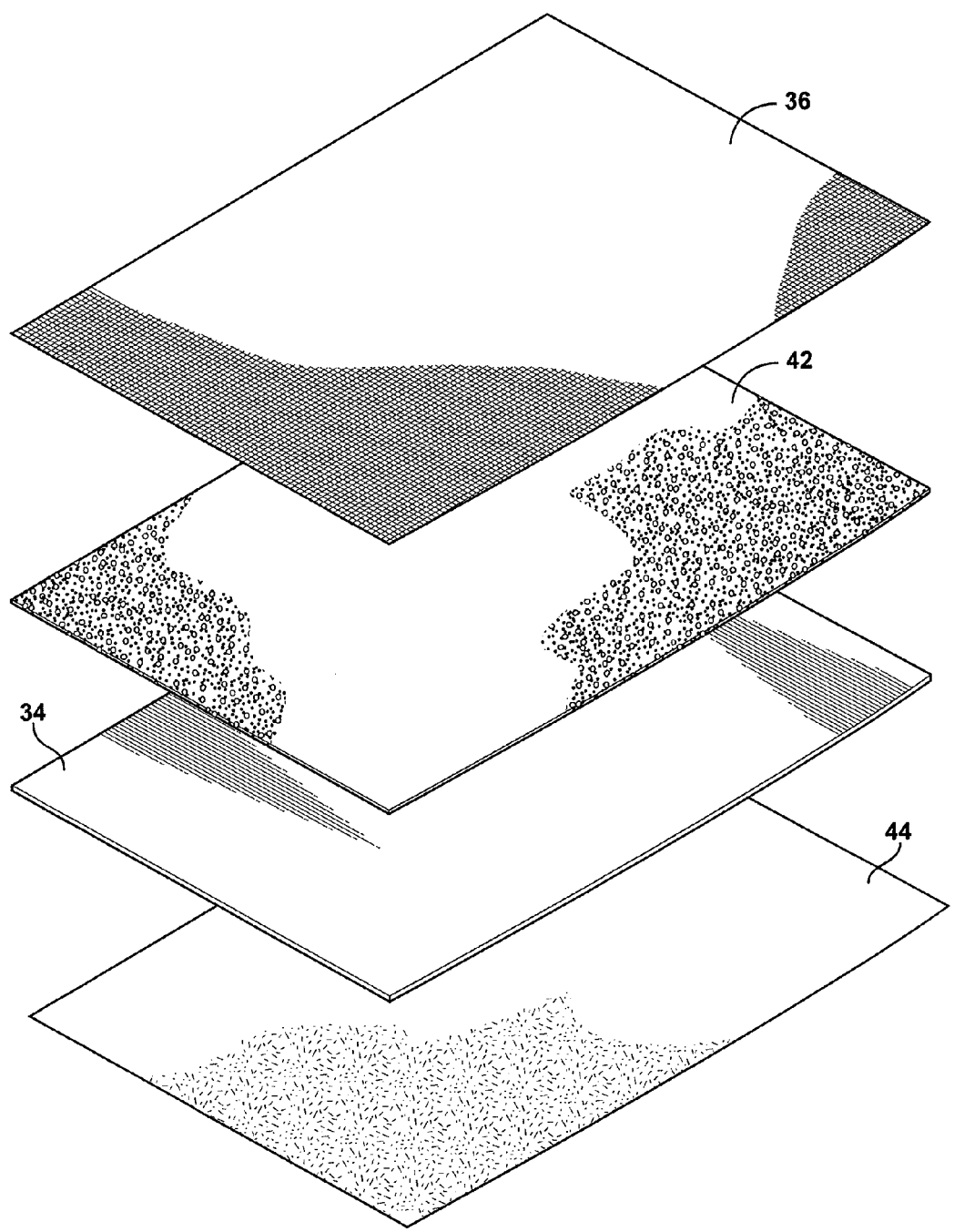
FIG. 3 is an exploded view of four layers of material laminated together to form a panel portion.

Referring now to FIG. 3, the sunshade 20 is preferably a composite article formed from a plurality of layers 34, 36, 42, 44. The layers 34, 36, 42, 44 may be laminated together in some embodiments or molded together in other embodiments. The sunshade 20 includes a substrate layer 34 for holding the shape of the sunshade 20 and providing a rigid body. The substrate layer 34 generally comprises a composite of plastic and a reinforcing agent. The plastic is preferably a thermoplastic, and more preferably polypropylene. The reinforcing agent preferably comprises a fibrous material, and more preferably glass fibers, e.g. fiber glass. It is to be appreciated that additional materials may be included in the substrate layer 34 without deviating from the subject invention. In addition, other thermoplastics and/or reinforcing agents can be used in addition to or alternative to those exemplified above. In some embodiments the substrate layer 34 may be a glass fiber filled polypropylene such as that offered by Azdel of Forest, Va. or Quadrant of Reading, Pa. In one embodiment the substrate layer 34 is formed of glass-fiber filled polypropylene with a density range of about 1000 grams per square meter (GSM) to about 2500 GSM.

The sunshade 20 further includes an aesthetic layer 36 presenting a show surface facing the interior of the vehicle 26. Preferably, the aesthetic layer 36 is formed of a cloth for coordinating with the interior of the vehicle 26. Alternatively, the aesthetic layer 36 may be a paint layer or any other type of appropriate coating. A foam layer 42 is generally disposed between the substrate layer 34 and the aesthetic layer 36 when the aesthetic layer 36 is cloth. However, in some embodiments the aesthetic layer 36 is fixed directly to the substrate layer 34.

The sunshade 20 still further includes a scrim layer 44 disposed on the substrate layer 34 opposite the show surface and facing the exterior of the vehicle 26. The scrim layer 44 provides an aesthetically pleasing surface on the sunshade 20 when viewed from the exterior of the vehicle 26. It is to be appreciated that several combinations of the aforementioned layers 34, 36, 42, 44 may be included on the sunshade 20 as well as additional layers without deviating from the subject invention depending on the requirements of the particular sunshade 20. In one embodiment, only the substrate layer 34 is included. Furthermore, adhesive layers may be applied between the substrate layer 34 and scrim layer 44, between the foam layer 42 and substrate layer 34, and/or between the aesthetic layer 36 and the foam layer 42. The layers 34, 36, 42, 44 are preferably laminated together as described below and shaped to form the sunshade 20.

Figure 4:
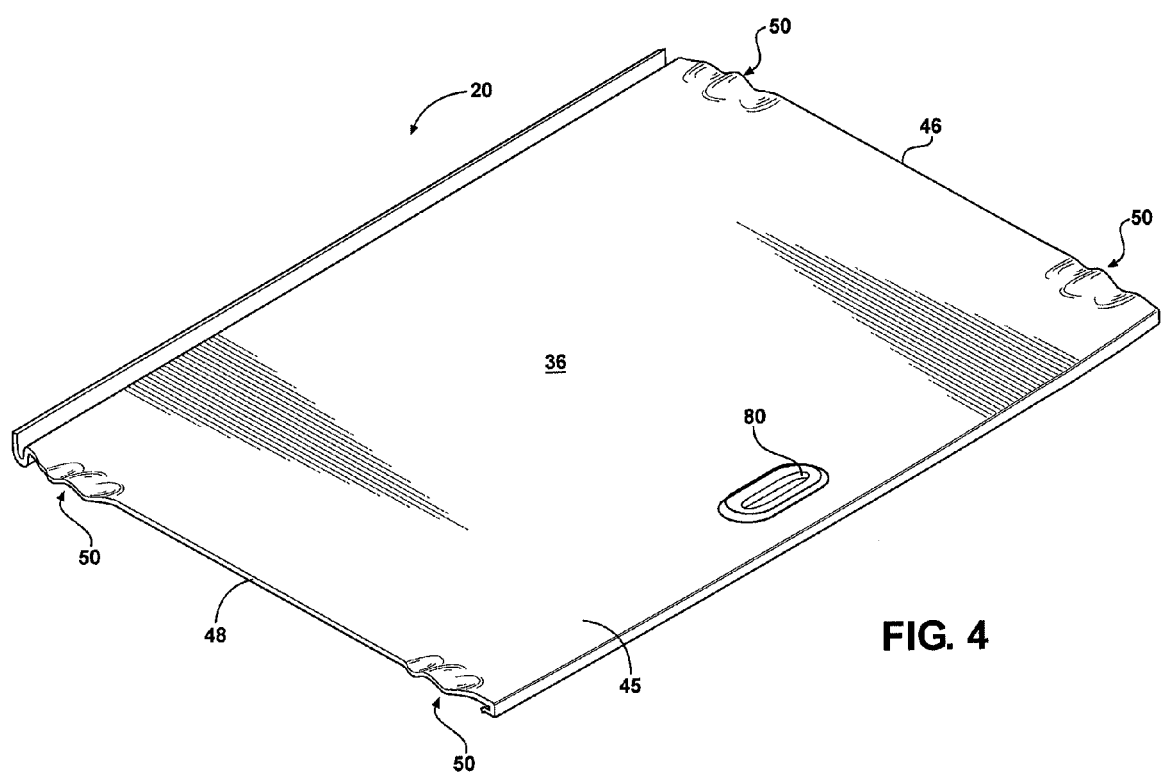
FIG. 4 is a perspective view of a sunshade.
Figure 5:
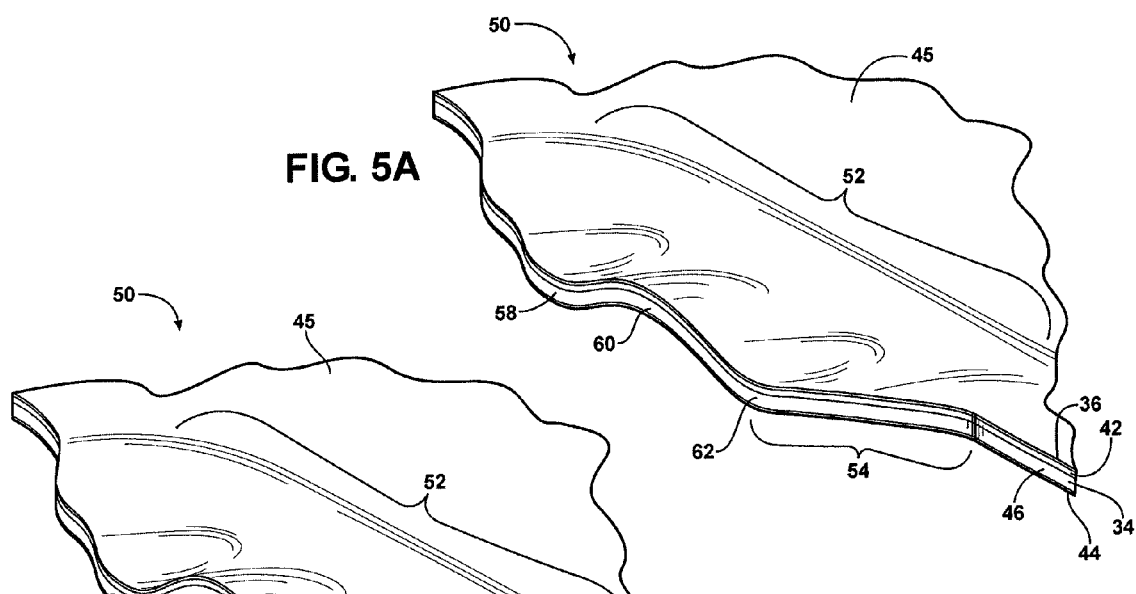
FIG. 5A is an enlarged perspective view illustrating a slide portion.
FIG. 5B is an enlarged perspective view illustrating a slide portion having a deeper second ridge than shown in FIG. 5A.

Referring to FIGS. 4, 5A, and 5B, the sunshade 20 includes a panel portion 45 having a first edge 46 and a second edge 48 spaced from the first edge 46. At least one slide portion 50 is disposed along each of the first and second edges 46, 48 and adapted to move within the channels of the first and second guides 28, 30 as the sunshade 20 moves between the open and closed positions. Each slide portion 50 includes a base portion 52 and a cantilevered portion 54. The base portion 52 is integrally formed with the panel portion 45. The cantilevered portion 54 extends out from the base portion 52 for presenting a generally corrugated configuration. The corrugated configuration exerts a force on the guides 28, 30 that must be overcome to move the sunshade 20 between the open position and the closed positions.

Figure 6:
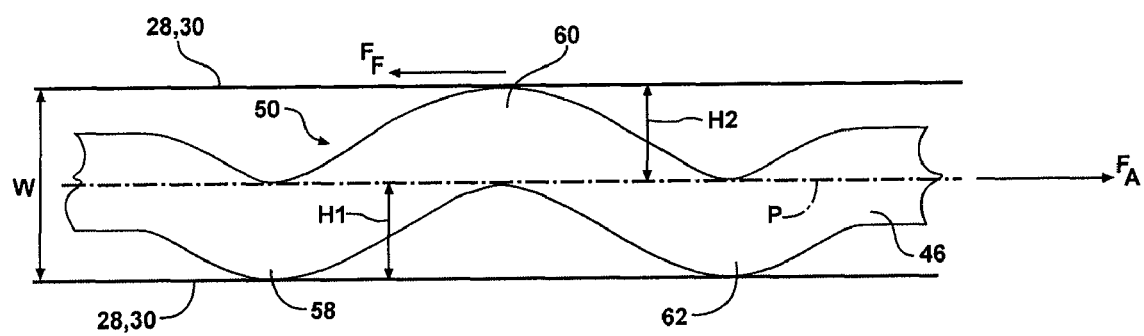
FIG. 6 is a side view of a slide portion and a guide illustrating an interaction of the slide portion and a plurality of forces acting thereupon.

Referring to FIG. 6, the first edge 46 and the second edge 48 define a plane P through the sunshade 20. Each slide portion 50 includes a first ridge 58, a second ridge 60 spaced from the first ridge 58, and a third ridge 62 spaced from the first ridge 58 and the second ridge 60 wherein the second ridge 60 is disposed between the first ridge 58 and the third ridge 62. The first ridge 58 and the third ridge 62 extend from the plane P in a first direction and the second ridge 60 extends from the plane P in a second direction opposite the first direction. In alternative embodiments the slide portions 50 may only include two ridges.

The first ridge 58 and the third ridge 62 extend a first height H1 from the plane P to one side of the guides 28, 30 while in the channel and the second ridge 60 extends a second height H2 in an opposite direction from the plane P to an opposite side of the guides 28, 30 while in the channel. The second height H2 may be modified, during manufacturing, to increase or decrease the magnitude of the force between the slide portions 50 and the first and second guides 28, 30. When the second height H2 is increased or decreased, the frictional force $F_F$ likewise increases or decreases, thereby changing the applied force $F_A$ needed to move the sunshade 20. This is because the slide portions 50 still fit into the same channel space of the guides 28, 30, which has a constant height W. For instance, when increasing the second height H2, a larger compressive force is needed to compress the slide portions 50 and fit the slide portions 50 into the guides 28, 30. This larger compressive force results in a larger frictional force $F_F$ between the slide portions 50 and the guides 28, 30 once the slide portions 50 are fit into the guides 28, 30. Consequently, a larger applied force $F_A$ will be needed to move the sunshade 20 between the open and closed positions.

The sunshade 20 defines a generally flat configuration between the first and second edges 46, 48. The amount of force that is exerted on each of the guides 28, 30 by the slide portions 50 is controlled by the corrugated configuration presented by each slide portion 50. As a result, the sunshade 20 can be made from thinner, less expensive materials.

Figure 7:
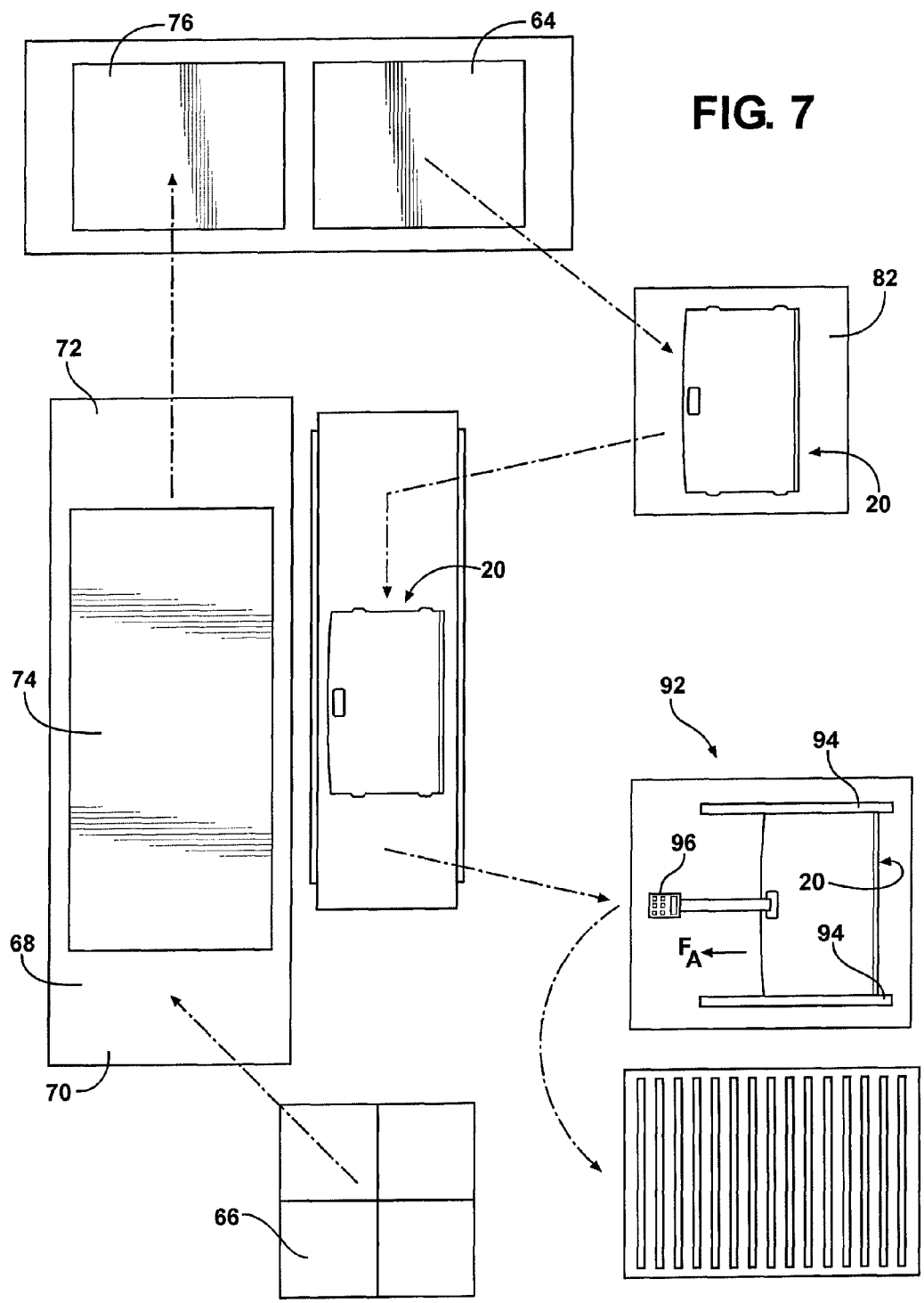
FIG. 7 is a schematic view of a manufacturing and testing cell for a sunshade.

As shown in FIG. 7, a process for manufacturing the sunshade 20 is illustrated. Each of the layers 34, 36, 42, 44 are stacked together at a preparation station 66 and loaded onto a conveyor 68 having a first end 70 and a second end 72. The layers 34, 36, 42, 44 travel through an oven 74 and are typically heated at a temperature of from about 335 to about 580 degrees F. to achieve a part with a core temperature of approximately 360 degrees F. Of course, this example of processing temperature is not intended to limit the invention.

The stacked layers 34, 36, 42, 44 are removed from the conveyor 68 at the second end 72 and placed in a form station 76, which includes a tooling assembly 78 for forming the sunshade 20 and each slide portion 50 thereupon. The form station 76 will be described in greater detail below.

The stacked layers 34, 36, 42, 44 are then placed in a trim fixture at a trim station 64, and held in place to trim the perimeter to a final shape, including cutting out each slide portion 50 as well as trimming away any flashing disposed about the perimeter. Typically a water jet is used to trim the sunshade 20, however any other appropriate trim system may be employed. A handle opening is also cut through the stacked layers 34, 36, 42, 44 for receiving a handle insert 80. The handle insert 80 is installed into the handle opening on the panel portion 45 at a handle install station 82.

The applied force $F_A$ required to move the sunshade 20 in the guides 28, 30 between the open and closed positions is measured at a slide force test station 92 to ensure that the applied force $F_A$ falls within a desired range. In some embodiments the desired applied force $F_A$ is 15N to 30N. The manufacturing process described above is merely illustrative and should not in any way be construed as limiting. Other processing steps may be employed in addition to or alternative to those described above. For example, the tooling assembly 78 may be heated in addition to or alternative to heating the stacked layers 34, 36, 42, 44 in the oven 74 depending on processing requirements of the materials used to form the sunshade 20.

Referring now to FIGS. 8-11, the tooling assembly 78 at the form station 76 for forming each slide portion 50 is described in greater detail. The tooling assembly 78 includes a first forming portion 98 comprising a first block 87. A plurality of first fixtures 84 having a first plurality of fixed forming surfaces 83, 85 are mounted to the first block 87. A plurality of first inserts 86, each having a first adjustable forming surface 81, are operationally coupled to the first block 87 and are adapted to move relative to the first fixtures 84.

The tooling assembly 78 further includes a second forming portion 99 comprising a second block 91. A plurality of second fixtures 88 having a second plurality of fixed forming surfaces 93, 95 are mounted to the second block 91. A plurality of second inserts 90, each having a second adjustable forming surface 89, are operationally coupled to the second block 91 and are adapted to move relative to the second fixtures 88. The second forming portion 99 is disposed adjacent to the first forming portion 98 and is adapted to complementarily mate with the first forming portion 98 to form the sunshade 20 and each slide portion 50. Preferably, there are four sets of the first fixtures 84 and first inserts 86 on the first forming portion 98 that are aligned with and mate with four sets of the second fixtures 88 and second inserts 90 on the second forming portion 99.

The first inserts 86 and the second inserts 90 are aligned to mate and cooperatively form the second ridge 60 of the slide portion 50. The inserts 86, 90 are adjusted to increase or decrease the second height H2 of the second ridge 60. The second height H2 of each slide portion 50 controls the amount of force between the slide portions 50 and the guides 28, 30. The first adjustable forming surface 81 and the second adjustable forming surface 89 are complimentary configured to each other, in a concave-convex relationship, for forming the second ridge 60. When the first inserts 86 are adjusted to change the second height H2, the second inserts 90 are also adjusted substantially the same amount and in the same direction as the first inserts 86 so as to maintain a relatively constant distance between the first and second adjustable forming surfaces 81, 89. Constant distance may be thinner than the panel portion 45, i.e., the slide portions 50 may be further compressed than the panel portion 45.

Figure 11:
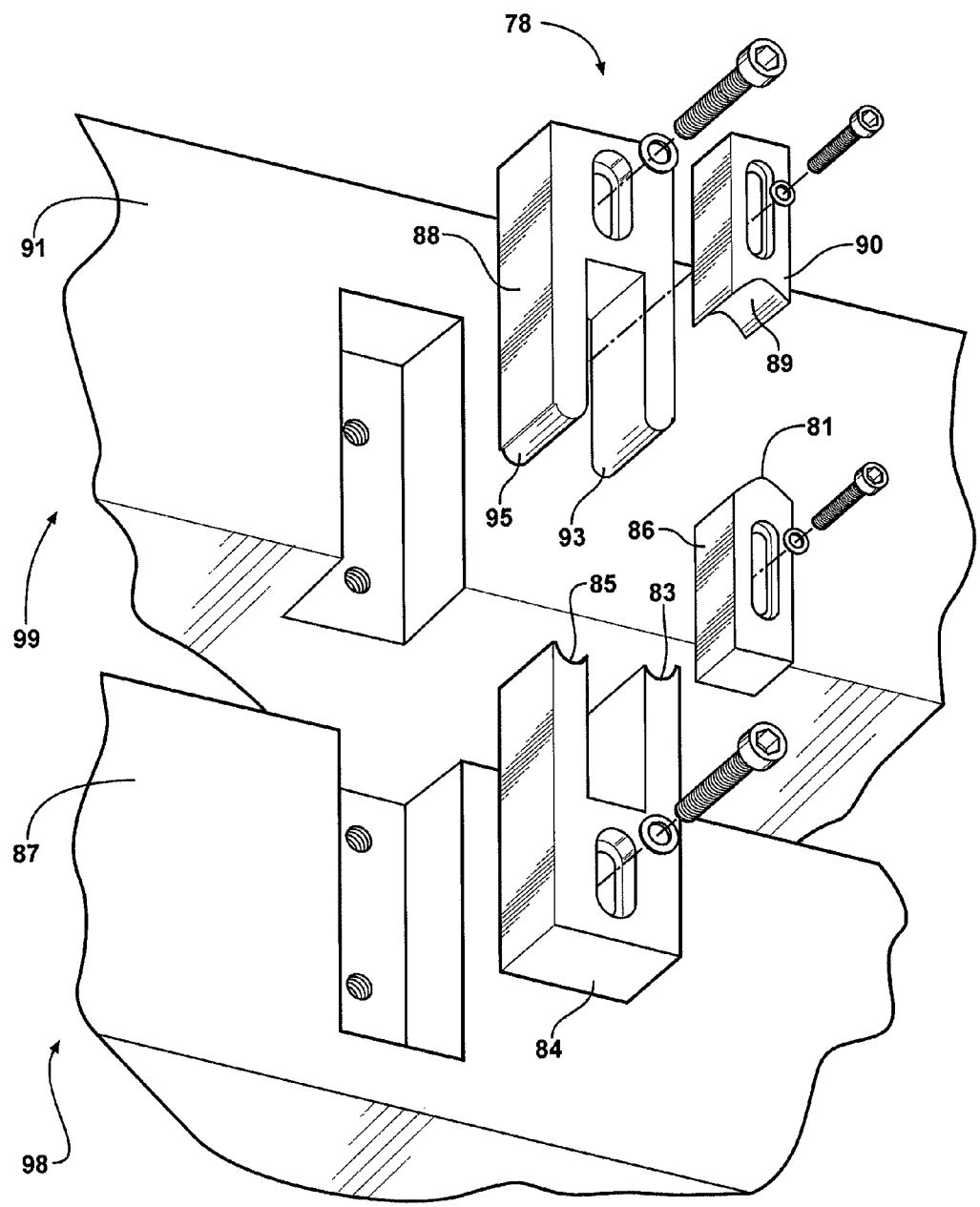
FIG. 11 is a partially exploded view of a tooling assembly for forming a slide portion of a sunshade.

In one example, the sunshade 20 is formed from a first lot of material with the inserts 86, 90 set to achieve a second height H2 such that the applied force $F_A$ required to move the sunshade 20 is within the desired range. When a second lot of material is introduced the applied force $F_A$ required to move the sunshade 20 falls outside of the desired range. The inserts 86, 90 are adjusted to bring the applied force $F_A$ required to move the sunshade 20 back within the desired range very quickly or on the fly. Referring to FIG. 11, the inserts 86, 90 are adjusted quickly by simply loosening adjustment screws holding each of the inserts 86, 90 to the blocks 87, 91 of the forming portions 98, 99, sliding the inserts 86, 90 up or down from their original position to a new adjusted position as needed and then re-tightening the adjustment screws to hold the inserts 86, 90 in the new position. Other adjustment mechanisms may be used to quickly move the inserts 86, 90 between first and second adjusted positions.

Figure 12:
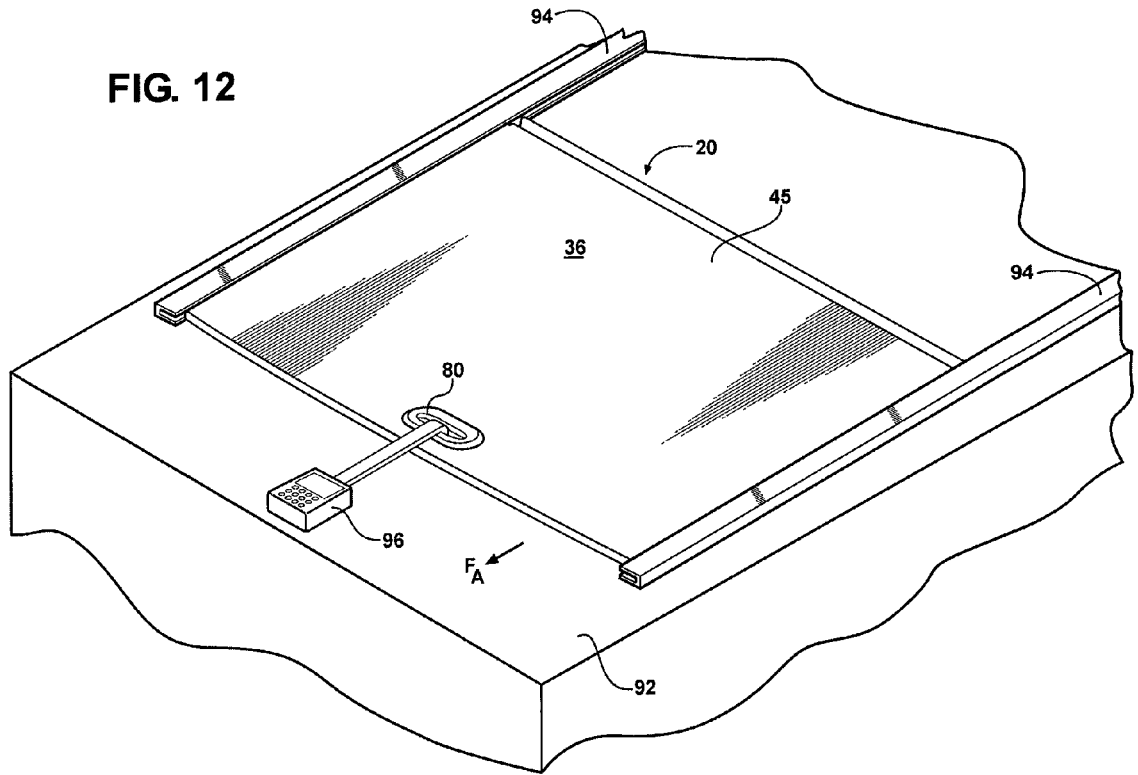
FIG. 12 is a perspective view of a slide force test fixture as introduced in FIG. 7.

As best shown in FIG. 12, the slide force test 92 is performed on the sunshade 20 after it is formed to ensure that the applied force $F_A$ required to move the sunshade 20 along the guides 28, 30 between the open and closed positions is sufficient to meet customer requirements. The sunshade 20 is placed in a pair of test rails 94 and a force gauge 96 is attached to the sunshade 20. The sunshade 20 is pulled through the test rails 94 and the force gauge 96 measures the amount of force required to move the sunshade 20. The applied force $F_A$ is generally measured in Newtons. However, any other appropriate units may also be used without deviating from the subject invention. When the measured applied force $F_A$ falls outside of a desired range, the second height H2 of the slide portions 50 can be tuned such that subsequently formed sunshades 20 fall within the desired range.

Figure 13:
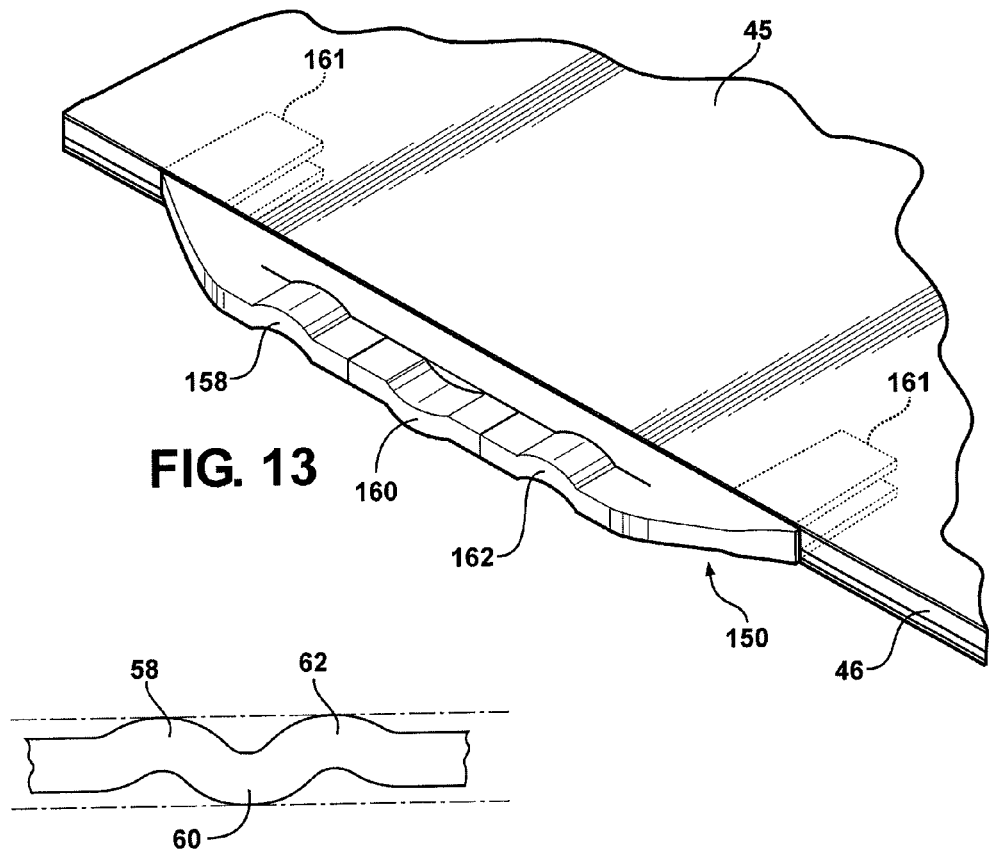
FIG. 13 is an enlarged perspective view illustrating a slide portion of an alternative embodiment.
Figure 14A:
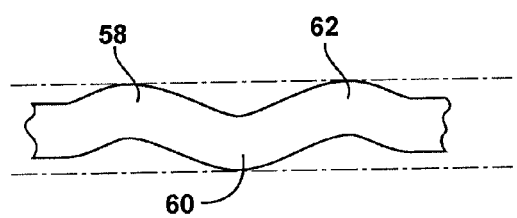
FIGS. 14A-14C are side views of alternative configurations of slide portions on a sunshade.
Figure 14B:
Figure 14C:
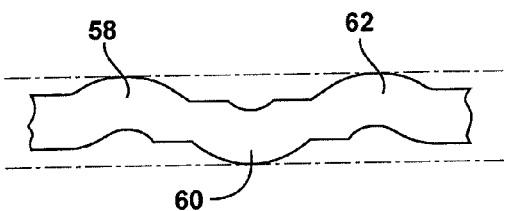

As shown in FIG. 13, in an alternative embodiment a slide portion 150 is a separate structure from the panel portion 45. A plurality of clips 161 may be used to couple the slide portion 150 to each of the edges 46, 48 of the panel portion 45. Alternatively, the slide portion 150 may be coupled to the edges 46, 48 with any appropriate adhesive or bonding agent. Similar to the primary embodiment discussed above, each slide portion 150 includes a first ridge 158, a second ridge 160 spaced from the first ridge 158, and a third ridge 162 spaced from the first ridge 158 and the second ridge 160 wherein the second ridge 160 is disposed between the first ridge 158 and the third ridge 162. The first ridge 158 and the third ridge 162 extend from the plane P in a first direction and the second ridge 160 extends from the plane P in a second direction opposite the first direction. FIGS. 14A-14C illustrate alternative configurations for the slide portion 50, 150. It is to be appreciated that these alternative configurations, as well as any other appropriate configuration, may be employed without deviating from the subject invention.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that reference numerals are merely for convenience and are not to be in any way limiting, the invention may be practiced otherwise than as specifically described.

What is claimed is:

1. A sunshade for a vehicle having a first guide and a second guide spaced from the first guide, said sunshade comprising:
   a panel portion having a pair of edges and including a substrate layer and an aesthetic layer fixed to said substrate layer;
   at least one slide portion disposed along each of said edges and adapted to move within the first and second guides as said sunshade moves between an open position and a closed position; and
   said at least one slide portion defining a generally corrugated configuration for providing a force that must be overcome to move said sunshade between the open position and the closed position.

2. The sunshade as set forth in claim 1 wherein said slide portion includes a base portion integrally formed with said panel portion.

3. The sunshade as set forth in claim 2 wherein said slide portion further includes a cantilevered portion extending from said base portion and presenting said corrugated configuration.

4. The sunshade as set forth in claim 3 wherein said corrugated configuration includes a first ridge, a second ridge spaced from said first ridge, and a third ridge spaced from said first ridge and said second ridge wherein said second ridge is disposed between said first ridge and said third ridge.

5. The sunshade as set forth in claim 4 wherein said edges define a plane and said first ridge and said third ridge extend from said plane in a first direction and said second ridge extends from said plane in a second direction opposite said first direction.

6. The sunshade as set forth in claim 5 wherein said first ridge and said third ridge define a first height from said plane and said second ridge defines a second height from said plane.

7. The sunshade as set forth in claim 1 wherein said panel portion defines a generally flat configuration.

8. The sunshade as set forth in claim 7 wherein said aesthetic layer is formed of cloth.

9. The sunshade as set forth in claim 8 further including a scrim layer bonded to said substrate layer.

10. The sunshade as set forth in claim 9 wherein said substrate layer is formed of glass fiber filled polypropylene.

11. A sunshade module for a vehicle, said module comprising:
    a first guide and a second guide;
    a sunshade movable between an open position and a closed position along said guides, said sunshade comprising:
    a panel portion having a pair of edges spaced from one another;
    at least one slide portion disposed on each of said edges within said first guide and said second guide, each of said slide portions presenting a generally corrugated configuration that provides a force that must be overcome to move said sunshade between the open position and the closed position.

12. The module as set forth in claim 11 wherein said slide portion includes a first ridge, a second ridge spaced from said first ridge, and a third ridge spaced from said first ridge and said second ridge wherein said second ridge is disposed between said first ridge and said third ridge.

13. The module as set forth in claim 12 wherein said edges define a plane and said first ridge and said third ridge extend a first height from said plane in a first direction and said second ridge extends a second height from said plane in a second direction opposite said first direction.

* * * * *